(12) United States Patent
Kuo et al.

(10) Patent No.: US 9,478,891 B2
(45) Date of Patent: Oct. 25, 2016

(54) USB DEVICE (71) Applicant: ADATA TECHNOLOGY CO., LTD., New Taipei (TW)

(72) Inventors: Tsung Hsing Kuo, Taipei (TW); Chia-Hsiang Hsiao, New Taipei (TW)

(73) Assignee: ADATA TECHNOLOGY, LTD., New Taipei (TW)

( * ) Notice: Subject to any disclaimer, the term of this patent is extended or adjusted under 35 U.S.C. 154(b) by 0 days.

(21) Appl. No.: 14/635,000

(22) Filed: Mar. 2, 2015

(65) Prior Publication Data
US 2016/0181717 A1 Jun. 23, 2016

(30) Foreign Application Priority Data
Dec. 19, 2014 (TW) .............................. 103222558 A (51) Int. Cl.
*H01R 13/44* (2006.01)
(52) U.S. Cl.
CPC .................................... *H01R 13/44* (2013.01)
(58) Field of Classification Search
CPC ...................................................... H01R 13/44
USPC ........................................................ 439/131
See application file for complete search history.

(56) References Cited

U.S. PATENT DOCUMENTS

| | | | | |
|---|---|---|---|---|
| 8,267,704 B2 * | 9/2012 | Cheng | .................... | H01R 13/60 439/131 |
| 8,469,729 B2 * | 6/2013 | Ding | ..................... | H01R 13/72 439/131 |
| 8,500,466 B2 * | 8/2013 | Zhang | .................. | H05K 5/0278 439/131 |
| 8,512,054 B2 * | 8/2013 | Lee | ........................ | H01R 24/38 320/107 |
| 8,622,757 B2 * | 1/2014 | Hsu | ..................... | H01R 13/4538 439/131 |
| 8,672,693 B2 * | 3/2014 | Liu | ........................ | H01R 13/44 439/131 |
| 2011/0217858 A1 * | 9/2011 | Zhao | ..................... | H01R 13/64 439/131 |

* cited by examiner

*Primary Examiner* — Abdullah Riyami
*Assistant Examiner* — Nelson R Burgos-Guntin
(74) *Attorney, Agent, or Firm* — Li & Cai Intellectual Property (USA) Office (57) ABSTRACT

A USB device is disclosed, comprising an external housing including an accommodating space, wherein a top surface of the external housing has a through hole. A main body is disposed in the accommodating space, wherein the main body slides along a direction. A first elastic component presses against the external housing and the main body. A positioning component is perpendicular the sliding direction of the main body and disposed in the through hole.

11 Claims, 9 Drawing Sheets

USB DEVICE

BACKGROUND OF THE INVENTION

1. Field of the Invention

The instant disclosure relates to a storage device; in particular, to a USB device.

2. Description of Related Art

In the recent years, high-tech products have shown rapid growth, and the need by users for storage medium has increased very fast. As technology has developed, disks have been replaced by USB devices having light weight and large memory capacity.

The traditional USB device uses a cap to cover the USB plug. The cap is taken off when using the USB device, and the cap covers the USB plug when the USB device is not used to prevent pollution or damage of the USB plug. However, the cap of the traditional USB device is easily lost, and using a cap to cover the USB plug is inconvenient for users. A USB device having a movable USB plug has been developed, but it is still not very convenient to use.

Therefore, the disclosure provides a new design of a USB device to effectually solve the drawbacks described above.

SUMMARY OF THE INVENTION

The objective of the instant disclosure is to provide a USB device which can solve the drawbacks of traditional USB devices.

In order to achieve the aforementioned objectives, according to an embodiment of the instant disclosure, a USB device is disclosed, comprising an external housing comprising an accommodating space, wherein a top surface of the external housing has a through hole. A main body is disposed in the accommodating space, wherein the main body slides along a direction. A first elastic component withstands the external housing and the main body. A positioning component is perpendicular to the sliding direction of the main body and disposed in the through hole.

According to the description above, the disclosure has the following features. A user can press the covering body to make the USB plug stick out of the external housing for data transferring. When data transferring is finished, the user can press the button body for the USB plug to return back to the external housing automatically according to the elastic force generated by the first elastic component. Operation of the USB device is easy and intuitive.

In order to further understand the instant disclosure, the following embodiments and illustrations are provided. However, the detailed description and drawings are merely illustrative of the disclosure, rather than limiting the scope being defined by the appended claims and equivalents thereof.

BRIEF DESCRIPTION OF THE DRAWINGS

FIG. 5A to FIG. 5E shows the operation of a USB device of an embodiment of the disclosure.

DETAILED DESCRIPTION OF THE PREFERRED EMBODIMENTS

The aforementioned illustrations and detailed descriptions are exemplary for the purpose of further explaining the scope of the instant disclosure. Other objectives and advantages related to the instant disclosure will be illustrated in the subsequent descriptions and appended drawings.

First Embodiment

Figure 1:
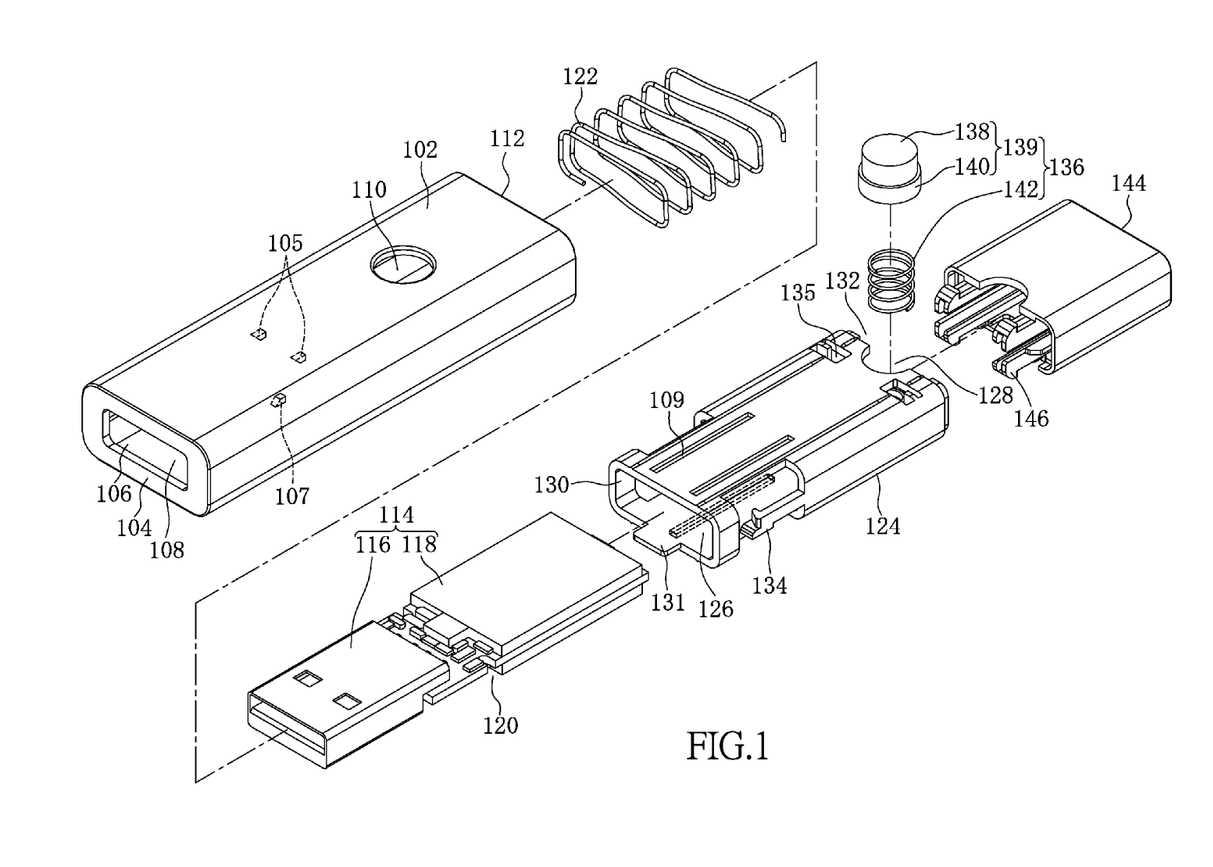
FIG. 1 shows an exploded view of the USB device of an embodiment of the disclosure.
Figure 2A:
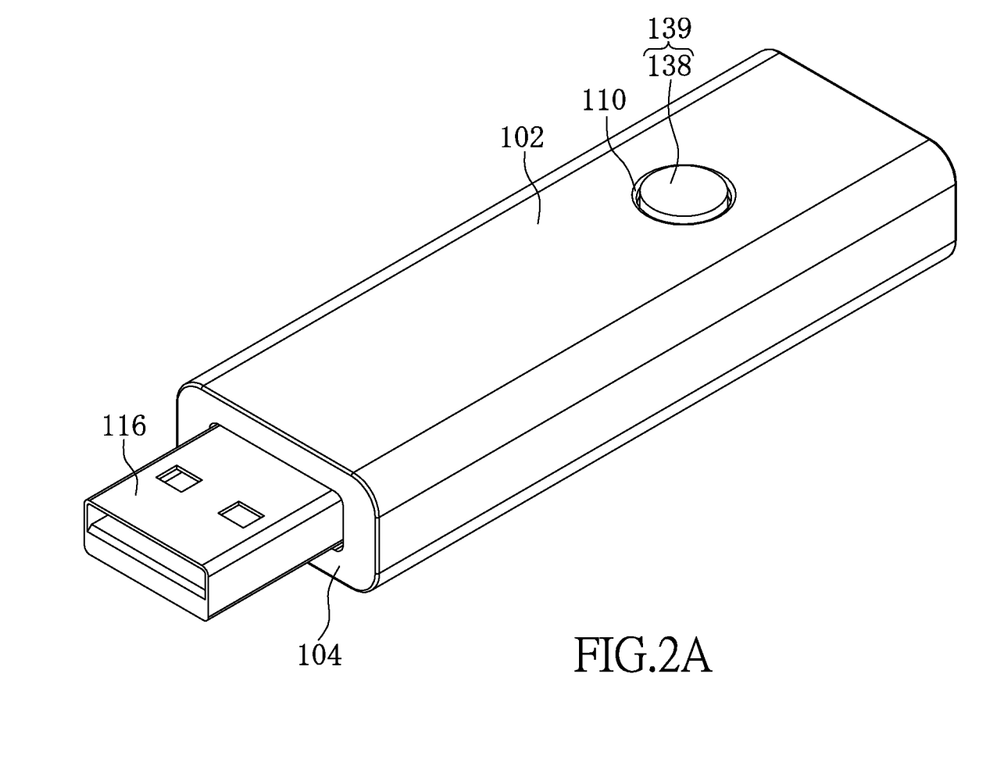
FIG. 2A shows a three dimensional view of a USB device of an embodiment of the disclosure.
Figure 2B:
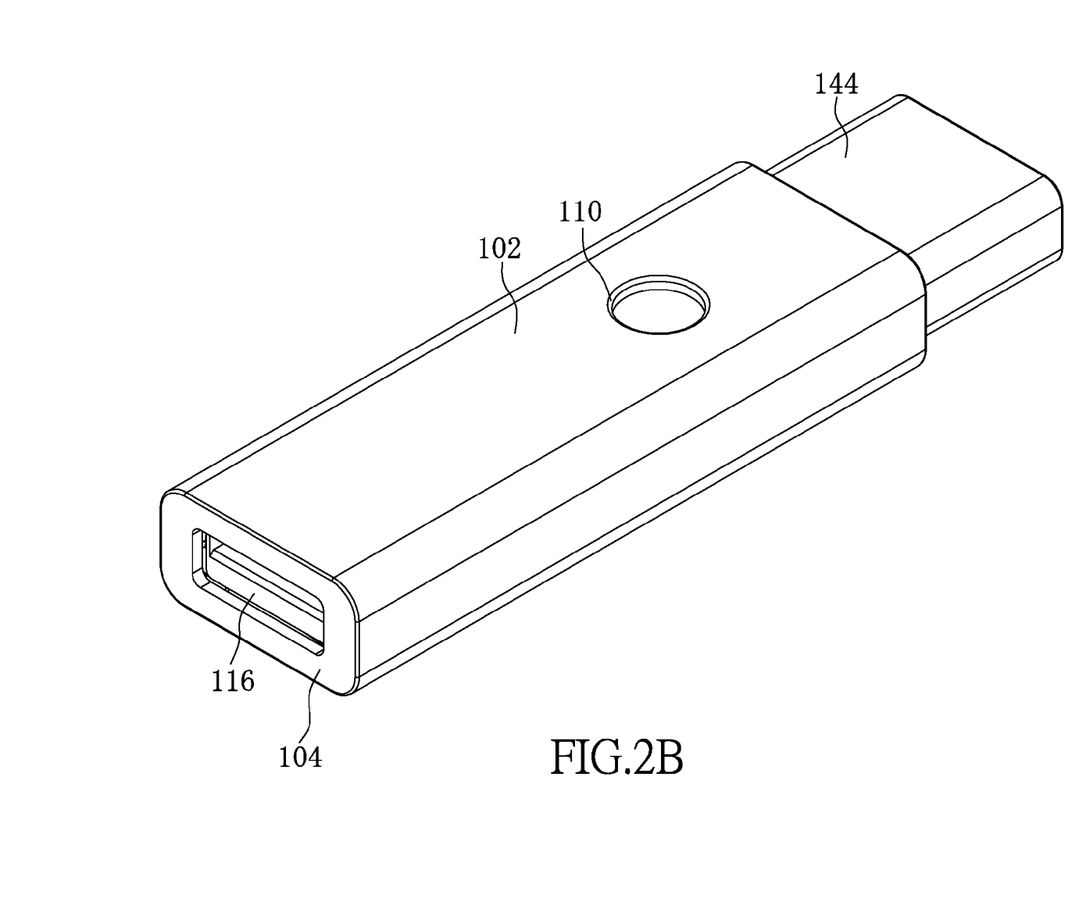
FIG. 2B shows a three dimensional view of a USB device of an embodiment of the disclosure.
Figure 2C:
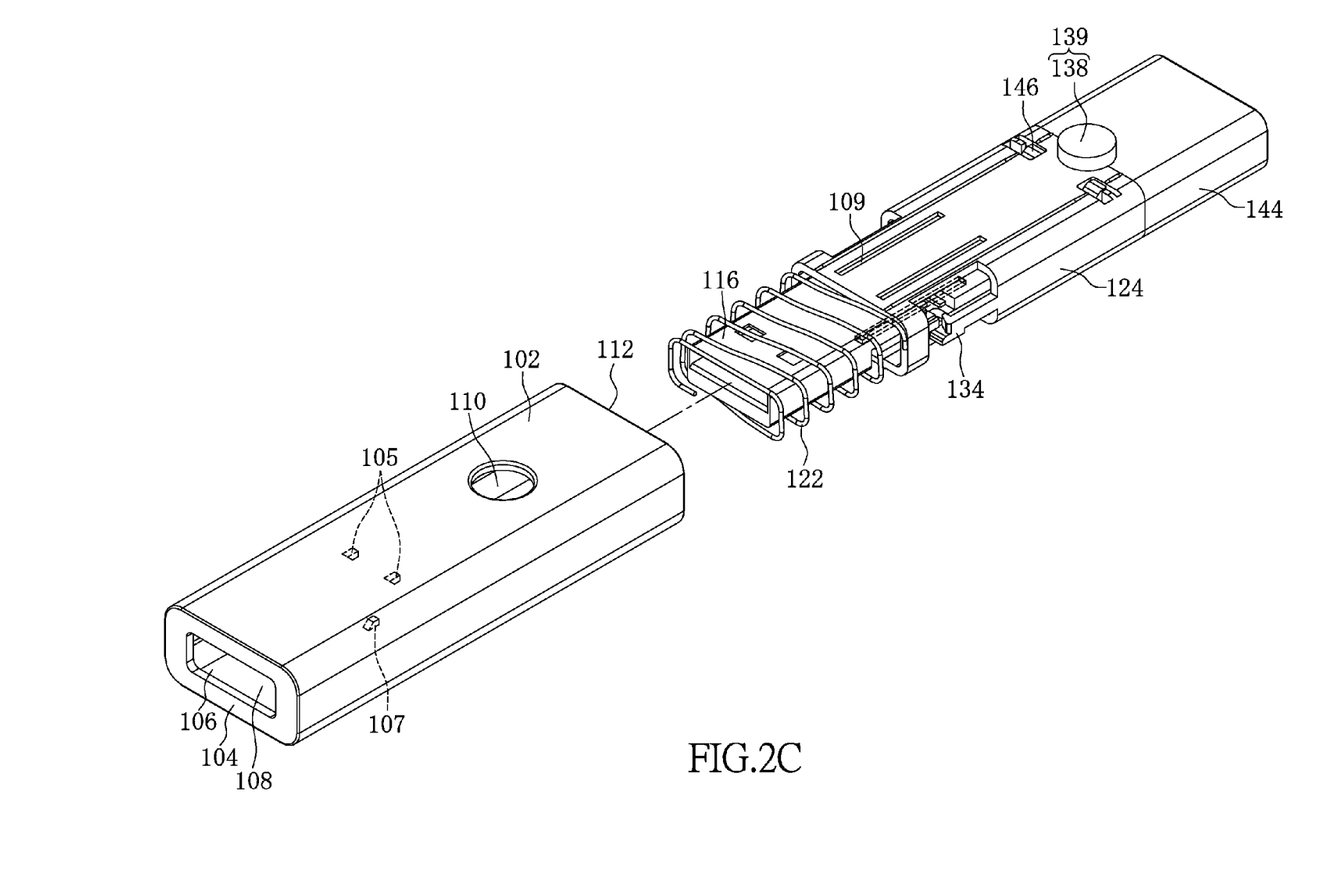
FIG. 2C shows a three dimensional views of the USB device with the external housing being spaced apart from the main body.
Figure 3:
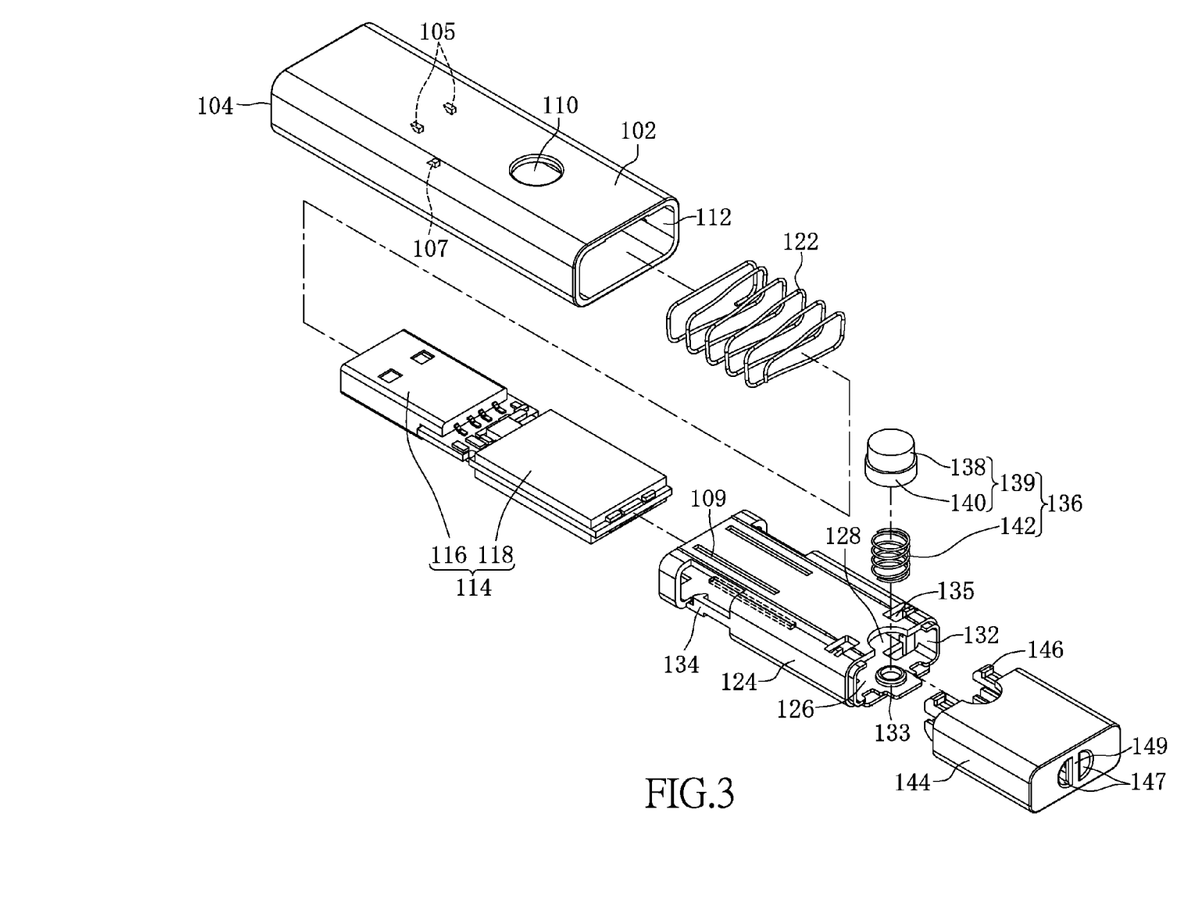
FIG. 3 shows an exploded view of a USB device at another view angle.
Figure 4:
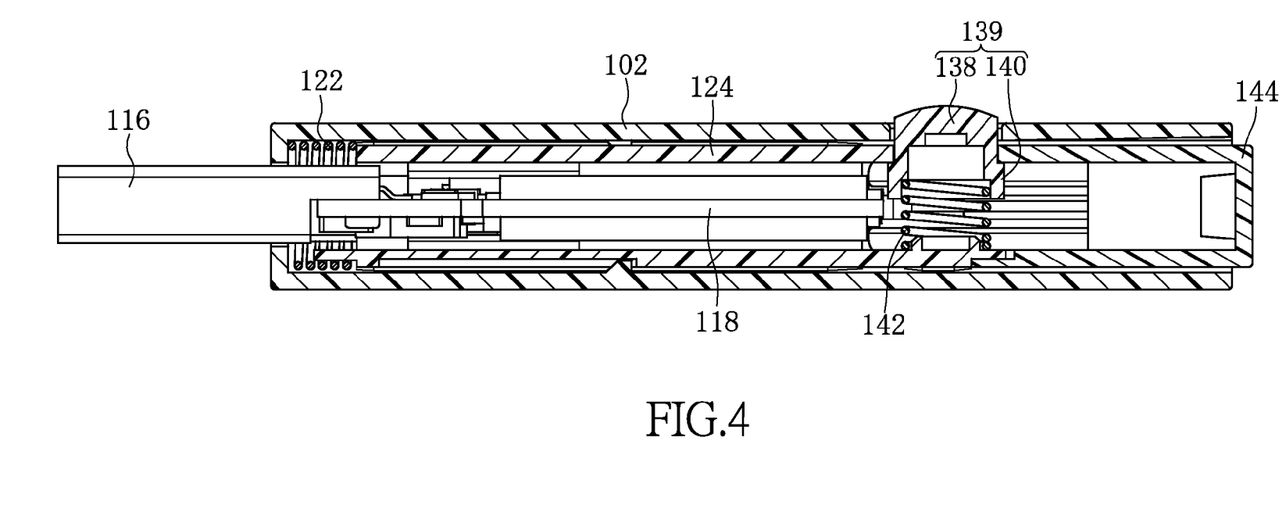
FIG. 4 shows a cross section of a USB device of an embodiment of the disclosure.

FIG. 1 shows an exploded view of the USB device of the embodiment. FIG. 2A and FIG. 2B show three dimensional views of the USB device of the embodiment, in which the USB plug extends out of the external housing in FIG. 2A, and the USB plug returns back to be in the external housing in FIG. 2B. FIG. 2C shows three dimensional views of the USB device with the external housing being spaced apart from the main body. FIG. 3 shows an exploded view of the USB device at another view angle. FIG. 4 shows a cross section of the USB device of the embodiment. Referring to FIG. 1, FIG. 2A-2C, FIG. 3 and FIG. 4, the USB device of the embodiment comprises an external housing 102, in which a first terminal of the external housing 102 comprises a resisting portion 104 surrounding a front end opening 106. The top surface of the external housing 102 comprises a through hole 110, and as shown in FIG. 1, the top surface simply includes a through hole 110. A second terminal of the external housing 102 comprises a back end opening 112, and since the first terminal has the resisting portion 104, the area of the front end opening 106 is smaller than area of the back end opening 112. In the embodiment, the resisting portion 104 is a ring shaped cover plate, but the disclosure does not limit the shape of the resisting portion 104. The resisting portion can be another shape. The external housing 102 substantially is a rectangular structure with an accommodating space 108 therein. As shown in FIG. 1, the top and bottom sides of the accommodating space 108 include guide rails, in which two guide rails 105 are formed on the inner surface of the top side of the accommodating space 108, and a guide rail 107 is formed on the inner surface of the bottom side of the accommodating space 108. The guide rails are used to limit the internal housing (to be illustrated in the following descriptions) sliding along a direction. However, the disclosure does not limit the quantity and type of guide rails 105, 107. For example, the top side of the accommodating space 108 can include one guide rail and the bottom side of the accommodating space 108 can include two rails. In another embodiment of the disclosure, the external housing 102 can include guide slots therein, and the internal housing 124 can include guide rails thereon.

A main body 114 is disposed in the accommodating space 108 of the external housing 102, in which the main body 114 comprises a USB plug 116 and a memory component 118. The USB plug 116 is a male contact used to connect to a female contact for transmitting data. The memory component 118 is a package which packages at least one memory component, and the USB plug 116 and the memory component 118 can be connected with each other by a plurality of pins (not shown).

A first elastic component 122 presses against the external housing 102 and the main body 114. In more detail, the first elastic component 122 can be a spring covering and surround the main body 114, in which one terminal of the spring 122 presses against the resisting portion 104 of the external housing 102 and another terminal presses against the resisting portion (not shown) of the main body 114. The disclosure is not limited to this structure. In another embodiment, a terminal of the first elastic component 122 presses against the resisting portion 104 of the external housing 102, and another terminal presses against the resisting portion (not shown) of the internal housing.

An internal housing 124 is disposed between the external housing 102 and the main body 114, and as described above, the internal housing 124 includes guide slots 109 at the top surface and the bottom surface. In addition, the internal housing 124 has clipping portions 134 at opposite sides for clipping recess portions 120 of the main body 114. Therefore, the main body 114 and the internal housing 124 can be fixed with each other, and there is no shift between the main body 114 and the internal housing 124. The internal housing 124 includes a front end opening 130 at the front terminal and a back end opening 132 at the back terminal. The internal housing 124 includes a protruding portion 131 neighboring the front end opening 130, and a recess portion 128 neighboring the back end opening 132. The internal housing 124 further comprises an accommodating space 126 therein, and as shown in FIG. 3, the internal housing 124 includes a fixing portion 133 disposed at the bottom inner surface of the accommodating space for fixing the positioning component 136. In addition, the internal housing 124 comprises two clipping slots 135 neighboring the back end opening 132, in which the clipping slots 135 are used for a covering component 144 to be fixed with the internal housing 124. The positioning component and the covering component will be described in detail in the following paragraph. The disclosure does not limit the quantity of the clipping slots. The quantity of clipping slots can be more or less than two.

As shown in FIG. 1 and FIG. 3, the positioning component 136 comprises a button body 139 and a second elastic component 142, in which the button body 139 can be a keystroke and the second elastic component 142 can be a spring. The bottom portion of the second elastic component 142 is fixed on the fixing portion 133 of the internal housing 124, and the positioning component 136 can stick out of the recess portion 128 of the internal housing 124 or return back to be in the internal housing 124. The button body 139 includes a first column shaped structure 138 at the upper portion thereof and a second column shaped structure 140 at the lower portion thereof, in which the diameter of the first column shaped structure 138 is less than the diameter of the second column shaped structure 140. Therefore, when the button body 139 protrudes through the through hole 110 of the external housing 102, only the first column shaped structure 138 sticks out of the through hole 110, and the second column shaped structure 140 withstands a portion of the external housing 102 around the through hole 110. Therefore, the entire button body 139 does not drop out of the external housing 102. The covering component 144 comprises two hook shaped clipping portions 146 to clip the corresponding clipping slots 135 of the internal housing 124. Therefore, the covering component 144 and the internal housing 124 can be jointed with each other. As shown in FIG. 3, the covering component 144 comprises two semicircular through holes 149, and a columnar body 149 is disposed between the through holes 147. Therefore, a user can use a rope to pass through the through holes 147 and tighten the columnar body 149 for conveniently carrying the USB device.

Figure 5A:
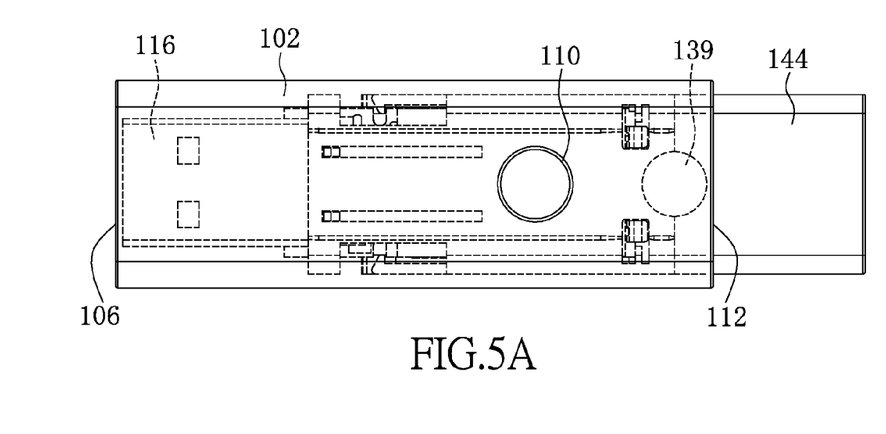
Figure 5B:
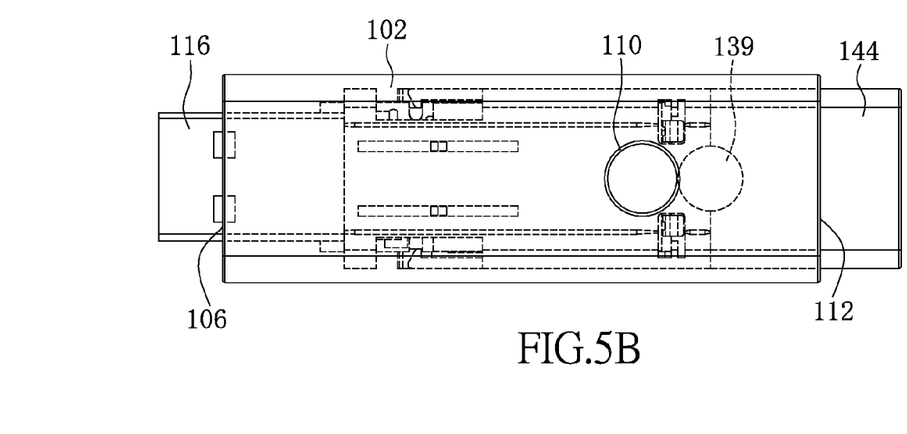
Figure 5C:
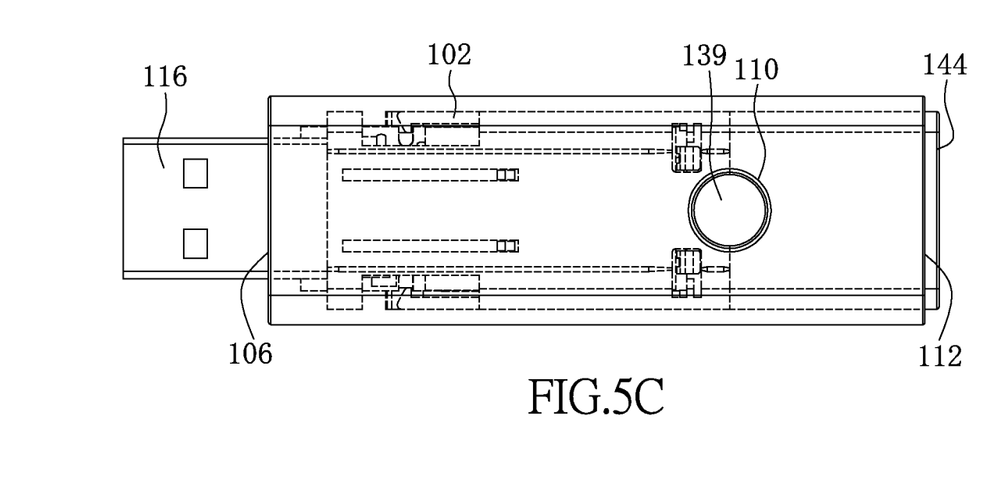

The operation of the USB device is illustrated in accordance with FIG. 5A to FIG. 5E of the disclosure, wherein the elements not shown in FIG. 5A to FIG. 5E can be found in FIGS. 1 and 3. First, referring to FIG. 5A, the main body 114 comprising the USB plug 116 and the memory component 118 of the USB device is within the external housing 102 when the USB device is not used. In more detail, the USB plug 116 does not stick out of the front opening 106 of the external housing 102 at this moment, and the positioning component 136 comprising the button body 139 and the second elastic component 142 does not stick out of the through hole 110 at the top surface of the external housing 102. Referring to FIG. 5B, when the USB device is used by a user to transfer data, he can push the covering component 144 to make the internal housing 124 and the main body 114 therein moving along the long-axis direction of USB device for the USB plug 116 to protrude through the front end opening 106 of the external housing 102. The first elastic component 122 pressing against the resisting portion 104 of the external housing 102 at one end and pressing against the resisting portion of the main body 144 at another end is pressed to generate an elastic force. Referring to FIG. 5C, when the entire USB plug 114 sticks out of the front end opening 106 or at least reaches a position, the positioning component 136 is overlapped with the through hole 110 of the external housing 102. The first column shaped structure 138 of the button body 139 of the positioning component 136 protrudes through the through hole 110 of the external housing 102 through the elastic force generated by the second elastic component 142 (the direction of the elastic force is perpendicular to the long axis of the USB device and the elastic force is along the direction from the bottom surface to the top surface of the external housing 102). Therefore, the first column shaped structure 138 of the button body 139 protrudes through the through hole 110 of the external housing 102, and the second column shaped structure 140 presses against a portion of the external housing 102 around the through hole 110.

Figure 5D:
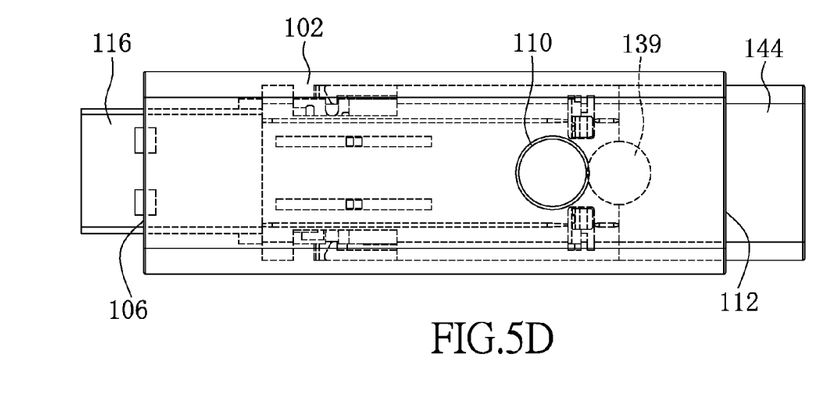
Figure 5E:
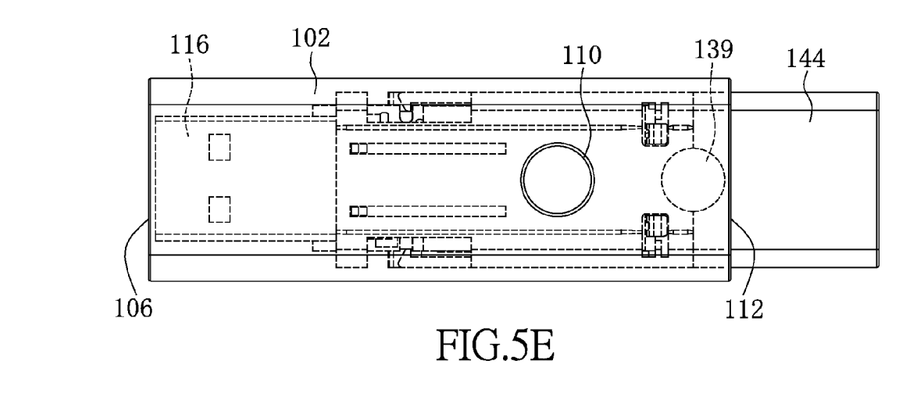

It is noted that the main body 114 of the USB device is applied with an elastic force by the first elastic component 122 at this moment. The direction of the elastic force is parallel to the long axis of the USB device, and is from the front end opening 106 of the external housing 102 to the back end opening 112. Because the first column shaped structure 138 of the button body 139 protrudes through the through hole 110 of the external housing 102, the main body 114 and the internal housing 124 of the USB device are fixed by the positioning component 136 and there is no shift between the main body 114 and the external housing 102. When the user finishes using the USB device, he can press the button body 139 to make it return back to the through hole 110. As well, the button body 139 returns back to the accommodating space 108 in the external housing 102. As shown in FIG. 5D, the elements of the USB device are not fixed at this moment so that the main body 114 moves toward the back end opening 112 of the external housing 102 according to the elastic force applied by the first elastic component (the direction of the elastic force is parallel to the long axis of the USB device and is from the front end opening 106 to the back end opening 112). As shown in FIG. 5D, the main body 114 stops moving after the USB plug 116 returns back to the accommodating space 108 in the external housing 102.

According to the description above, the disclosure has features as follows. A user can press the covering body to make the USB plug moving out of the external housing for data transferring. When data transferring is finished, the user can press the button body to make the USB plug return back to be in the external housing automatically according to the elastic force generated by the first elastic component. Therefore, the operation is easy and intuitive.

The figures and descriptions supra set forth illustrate the preferred embodiments of the instant disclosure; however, the characteristics of the instant disclosure are by no means restricted thereto. All changes, alterations, combinations or modifications conveniently considered by those skilled in the art are deemed to be encompassed within the scope of the instant disclosure delineated by the following claims.

What is claimed is:

1. A USB device, comprising:
    an external housing including an accommodating space, wherein a top wall of the external housing has a through hole, wherein the external housing includes a resisting portion formed at a front end thereof, a back end opening formed at a back end thereof, and a front end opening formed through the resisting portion;
    an internal housing (124), being slidably disposed in the accommodating space of the external housing;
    a covering component, having a front end fixedly connected to a back end of the internal housing, wherein the covering component is slidable related to the external housing and is selectively exposed outside the back end opening of the external housing;
    a main body, having a back end fixedly connected to the internal housing opposite to the covering component, wherein the main body has a plugging end;
    a first elastic component disposed between the resisting portion and a front end of the internal housing, so as to provide an elastic force acted on the internal housing toward the back end of the external housing; and
    a positioning component includes a button body and a second elastic component, wherein the second elastic component has one end fixed on the inertial housing and the other end pushed the button body slidably in the through hole;
    wherein the main body, the positioning component and the covering component are slidably received in the accommodating space of the external housing with the internal housing;
    wherein the main body is selectably stayed in a first position by pushing the covering component to be received in the external housing, the internal housing and the main body are correspondingly slid toward the front end of the resisting portion, the plugging end of the main body is exposed outside the front end opening of the resisting portion, wherein the button body of the positioning component is pushed by the second elastic component and protruded outside the through hole so as to remain the main body in the first position;
    wherein the main body is selectably stayed in a second position by pushing downward the button body of the positioning component away from the through hole, the internal housing and the main body are pushed by the first elastic component and slid toward the back end opening of the external housing, and the plugging end of the main body returned and received in the accommodating space of the external housing.

2. The USB device as recited in claim 1, wherein the internal housing is formed with a positioning portion; the second elastic component has one end abutted against the button body and the other end fixed to the positioning portion of the internal housing.

3. The USB device as recited in claim 1, wherein the main body comprises a USB plug and a memory component connected to the USB plug, and the plugging end is a free end of the USB plug.

4. The USB device as recited in claim 3, wherein the USB plug stretches out the front end opening of the resisting portion, the button body of the positioning component sticks out the through hole.

5. The USB device as recited in claim 4, wherein the button body of the positioning component is in the through hole, the first elastic component applies a force to the main body to make the USB plug of the main body return to the accommodating space of the external housing.

6. The USB device as recited in claim 3, wherein the first elastic component is a spring, and the spring surrounded the USB plug.

7. The USB device as recited in claim 1, wherein the button body includes a first column shaped structure formed at an upper portion thereof, and a second column shaped structure formed at a lower portion thereof, a diameter of the first column shaped structure is smaller than a diameter of the second column shaped structure, and the diameter of the second column shaped structure is smaller than a diameter of the through hole.

8. The USB device as recited in claim 1, wherein the second elastic component is a spring.

9. The USB device as recited in claim 1, wherein the accommodating space of the external housing includes at least one guide rail, and an outside of the internal housing includes at least one guide slot, the at least one guide rail are slidably disposed in the at least one guide slot, thereby the internal housing is slidably disposed in the accommodating space of the external housing.

10. The USB device as recited in claim 1, wherein the internal housing includes at least one clipping slot formed at a back end thereof, and the covering component includes at least one clipping portion formed at a front end thereof to clip the at least one clipping slot correspondingly.

11. The USB device as recited in claim 10, wherein the internal housing includes at least one clipping portion formed at a front end thereof, and the main body includes at least one clipping recess portion, thereby the main body and the internal housing are fixedly connected.

* * * * *

UNITED STATES PATENT AND TRADEMARK OFFICE
CERTIFICATE OF CORRECTION

Page 1 of 1

| | |
|---|---|
| PATENT NO. | : 9,478,891 B2 |
| APPLICATION NO. | : 14/635000 |
| DATED | : October 25, 2016 |
| INVENTOR(S) | : Tsung Hsing Kuo and Chia-Hsiang Hsiao |

It is certified that error appears in the above-identified patent and that said Letters Patent is hereby corrected as shown below:

On the Title Page

Item [73], insert:
--Assignee: ADATA TECHNOLOGY CO., LTD., New Taipei City (TW)--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*